US006147621A

United States Patent [19]
Apschner et al.

[11] Patent Number: 6,147,621
[45] Date of Patent: Nov. 14, 2000

[54] ACCESS CONTROL SYSTEM FOR CONTROLLING THE ACCESS TO AT LEAST ONE SPACE, AND PRODUCT INCLUDING AN ACCESS CONTROL SYSTEM

[75] Inventors: Martin Apschner, Graz, Austria; Thomas Rudolph, Hamburg, Germany; Bernhard Spiess, Graz, Austria

[73] Assignee: U.S. Philips Corporation, New York, N.Y.

[21] Appl. No.: 09/009,747

[22] Filed: Jan. 20, 1998

[30] Foreign Application Priority Data

Jan. 21, 1997 [EP] European Pat. Off. .............. 97890011

[51] Int. Cl.[7] .............................. G07D 7/00; H04Q 5/22; G01S 13/74

[52] U.S. Cl. ............................... 340/825.31; 340/825.34; 340/825.54; 340/825.69; 342/42; 342/44

[58] Field of Search ......................... 340/825.31, 825.34, 340/825.54, 825.69, 825.72, 426, 572.1; 342/42, 44, 51; 361/172; 380/287; 307/10.5; 70/256

[56] References Cited

U.S. PATENT DOCUMENTS

| | | | |
|---|---|---|---|
| 4,672,375 | 6/1987 | Mochida et al. | 340/825.31 |
| 4,700,186 | 10/1987 | Fujino et al. | 340/825.72 |
| 4,760,394 | 7/1988 | Takeuchi et al. | 340/825.54 |
| 4,881,148 | 11/1989 | Lambropoulos et al. | 361/172 |
| 5,157,389 | 10/1992 | Kurozu et al. | 340/825.31 |
| 5,499,022 | 3/1996 | Boschini | 340/825.69 |

FOREIGN PATENT DOCUMENTS

0523602A1 1/1993 European Pat. Off. .

OTHER PUBLICATIONS

"Keyless Entry System with Radio Card Transponder", IEEE Transaction on Industrial Electronics, vol. 34, No. 2, May 1988, pp. 208–216.

*Primary Examiner*—Michael Horabik
*Assistant Examiner*—M. Phan

[57] ABSTRACT

In an access control system (8)—which comprises a transponder communication device (9) and at least two transmission coils (11, 12) connected to the transponder communication device (9), for receiving transponder signals, of which a first transmission coil (11) is associated with a first door (2), and which comprises a first activation device (18 associated with the first transmission coil (11) and the first door (12), and which comprises a first door opener (23) for the first door (2) and a logic device (45) for activating the first door opener (23)—the two transmission coils (11, 12) have arbitrarily large receiving ranges and the first transmission coil (11) and at least one further transmission coil (12) are followed by amplitude detector (34, 36) by which the amplitudes of the transponder signals supplied by the two transmission coils (11, 12) can be detected and the logic device is arranged after the amplitude detector (34, 36) and adapted to detect a condition in which the amplitude of the transponder signal supplied by the first transmission coil (11) is greater than the amplitude supplied by the second transmission coil (12), which first door opener (23) for the first door (2) can be activated the logic device (45) only upon detection of this condition.

10 Claims, 4 Drawing Sheets

ACCESS CONTROL SYSTEM FOR CONTROLLING THE ACCESS TO AT LEAST ONE SPACE, AND PRODUCT INCLUDING AN ACCESS CONTROL SYSTEM

BACKGROUND OF THE INVENTION

The invention relates to an access control system by means of which the access to at least one space via at least one door can be controlled and which includes a transponder communication device adapted to provide contactless communication with at least one transponder which controls the authorization to access via the at least one door, and which includes at least two transmission coils each having a given receiving range, which coils are adapted to receive transponder signals which each contain at least one type of authorization information and which are connected to the transponder communication device which is capable of detecting identification information representative of at least a part of a received transponder signal, and which includes a first activation device which can be activated by an authorized person, which first activation device is associated with the first transmission coil and the first door and by means of which access to its associated first door can be initiated and which is connected to the transponder communication device, which is capable of generating first activation information representing the activated first activation device, and which includes at least one door opener which can be activated by means of the transponder communication device so as to open a door, and which includes a logic device by means of which the door opener of the first door can be activated upon receipt of identification information representing at least a part of a transponder signal received by the first transmission coil, and of first activation information.

The invention further relates to a product including an access control system, by means of which the access to at least one space in the product via at least one door can be controlled and which includes a transponder communication device adapted to provide contactless communication with at least one transponder which controls the authorization to access via the at least one door, and which includes at least two transmission coils each having a given receiving range, which coils are adapted to receive transponder signals which each contain at least one type of authorization information and which are connected to the transponder communication device which is capable of detecting identification information representative of at least a part of a received transponder signal, and which includes a first activation device which can be activated by an authorized person, which first activation device is associated with the first transmission coil and the first door and by means of which access to its associated first door can be initiated and which is connected to the transponder communication device, which is capable of generating first activation information representing the activated first activation device, and which includes at least one door opener which can be activated by means of the transponder communication device so as to open a door, and which includes a logic device by means of which the door opener of the first door can be activated upon receipt of identification information representing at least a part of a transponder signal received by the first transmission coil, and of first activation information.

Such an access control system of the type defined in the first paragraph and a product in the form of a motor vehicle of the type defined in the second paragraph are known from the magazine *IEEE Transactions on Industrial Electronics,*

Vol. 35, No. 2, May 1988, pp. 208 to 216. The known motor vehicle including the known access control system, by means of which the access to the passenger compartment and the trunk of the known motor vehicle can be controlled, comprises two transmission coils, of which one transmission coil is associated with the driver's door of the motor vehicle and of which the other transmission coil is associated with the trunk of the motor vehicle. With respect to the two transmission coils it is to be noted that these coils have only a small receiving range situated inside a semicircle having a radius of approximately 70 cm, and that the transmission coil associated with the driver's door is arranged at the location of the driver's door handle and the other transmission coil associated with the trunk lid is arranged at the location of the rear bumper. The receiving ranges of the two transmission coils should not overlap one another, which requirement is met by the known motor vehicle. Moreover, this known motor vehicle including the known access control system has a driver's door switch near the driver's door handle and a trunk lid switch on the trunk lid, the driver's door switch forming a first activation device and the trunk lid switch forming a second activation device. Owing to the closely spaced arrangement of the one transmission coil and the driver's door switch forming the first activation device at the location of the driver's door handle and the closely spaced arrangement of the other transmission coil and the trunk lid switch forming the second activation device on or in the proximity of the trunk lid, it has been achieved that in the case that an authorized person, who carries a transponder which controls the access authorization by means of authorization information, i.e. by means of a code, actuates one of the switches provided as activation devices—after which a transponder signal containing authorization information is transmitted from the transponder to the transmission coil situated in the proximity of the actuated switch and from this coil to the transponder communication device and the authorization information is detected and evaluated as identification information in the transponder communication device—the motor vehicle door corresponding to the actuated switch is opened correctly.

However, in a comparatively large number of cases it is not possible, or only at a substantial expense, to arrange a transmission coil having only a small receiving range as closely as possible to the corresponding activation device of an access control system. It such cases the only possibility may be to arrange the transmission coil comparatively far from its associated activation device but, as a result of the small receiving range of such a transmission coil, this has the disadvantage that it requires a comparatively complicated manipulation or special precautions in order achieve at the same time activation of the activation device and transmission of a transponder signal containing authorization information from a transponder to the transmission coil associated with the activated activation device and thereby assure a correct opening of a door selected by an authorized person. Furthermore, it is to be noted with regard to the known motor vehicle including the known access control system that owing to the small receiving ranges of the transmission coils a separate transmission coil must be provided for each door of the motor vehicle. This involves additional expenditure with regard to material costs and, particularly, assembly costs, which is unfavorable.

SUMMARY OF THE INVENTION

It is an object of the invention to preclude the aforementioned problems with an access control system of the type defined in the first paragraph and a product of the type defined in the second paragraph and to improve such an access control system and such a product with aid of simple means.

According to the invention, in order to achieve this object in an access control system of the type defined in the first paragraph, the transmission coils have arbitrarily large receiving ranges and the first transmission coil and at least one further transmission coil are followed by amplitude detection means by which the amplitudes of the transponder signals supplied by these transmission coils can be detected and by which, after the amplitudes have been detected, amplitude information can be generated as identification information, and the amplitude information generated by the amplitude detection means can be applied to the logic device as identification information, and the logic device is adapted to detect a condition in which the amplitude of the transponder signal supplied by the first transmission coil is greater than the amplitude supplied by the at least one further transmission coil, and the door opener of the first door can be activated only by means of the logic device upon detection of this condition. Thus, it is achieved with very simple means and substantially without any additional expense, that in an access control system in accordance with the invention each transmission coil associated with an activation device can be arranged at a comparatively large distance from its associated activation device and, in addition, a comparatively free choice of the relative position of a transmission coil with respect to its associated activation device is achieved, and that it is not necessary to limit the receiving ranges of the transmission coils used in an access control system in any way. Another advantage is that in an access control system in accordance with the invention it is also possible to use a plurality of activation devices, each associated with one door, in conjunction with one transmission coil because upon activation of all the activation devices associated with this one transmission coil by an authorized person the transponder carried by the respective authorized person comes within the receiving range of this transmission coil and, consequently, a proper contactless communication between this transponder and the transmission coil and thus with the transponder communication device connected to the transmission coil is guaranteed.

In an access control system in accordance with the invention it has proved to be advantageous if the first transmission coil, which is associated with the first door and the first activation device, is associated, in addition, with a further first activation device, which in its turn is associated with a further first door. In practice, such an embodiment has proved to be very favorable.

In an access control system in accordance with the invention it has further proved to be advantageous if a second transmission coil is associated with a second door and there has been provided at least one second activation device which can be activated by an authorized person and which is associated with the second transmission coil and the second door, by means of which second activation device the access via its associated second door can be initiated. In practice, this has also proved to be a very favorable solution.

In an access control system in accordance with the invention it has further proved to be advantageous if the second transmission coil, which is associated with the second door and the second activation device, is associated, in addition, with a further second activation device, which in its turn is associated with a further second door. Such an embodiment has also proved to be very favorable.

According to the invention, in order to achieve the aforementioned object in a product of the type defined in the second paragraph, the transmission coils have arbitrarily large receiving ranges and the first transmission coil and at least one further transmission coil are followed by amplitude detection means by which the amplitudes of the transponder signals supplied by these transmission coils can be detected and by which, after the amplitudes have been detected, amplitude information can be generated as identification information, and the amplitude information generated by the amplitude detection means can be applied to the logic device as identification information, and the logic device is adapted to detect a condition in which the amplitude of the transponder signal supplied by the first transmission coil is greater than the amplitude supplied by the at least one further transmission coil, and the door opener of the first door can be activated only by means of the logic device upon detection of this condition. Thus, it is achieved with very simple means and substantially without any additional expense, that in a product in accordance with the invention each transmission coil associated with an activation device can be arranged at a comparatively large distance from its associated activation device and, in addition, a comparatively free choice of the relative position of a transmission coil with respect to its associated activation device is achieved, and that it is not necessary to limit the receiving ranges of the transmission coils used in a product in accordance with the invention in any way. In a product in accordance with the invention including an access control system it is also possible to use a plurality of activation devices, each associated with one door, in conjunction with one transmission coil owing to the arbitrarily large receiving range of this coil because upon activation of all the activation devices associated with this one transmission coil by an authorized person the transponder carried by the respective authorized person comes within the receiving range of this transmission coil and, consequently, a proper contactless communication between this transponder and the transmission coil and thus with the transponder communication device connected to the transmission coil is guaranteed.

In a product in accordance with the invention it has proved to be advantageous if the first transmission coil, which is associated with the first door and the first activation device, is associated, in addition, with a further first activation device, which in its turn is associated with a further first door. In practice, this has proved to be very favorable.

In a product in accordance with the invention it has further proved to be advantageous if a second transmission coil is associated with a second door and there has been provided at least one second activation device which can be activated by an authorized person and which is associated with the second transmission coil and the second door, by means of which second activation device the access via its associated second door can be initiated. In practice, this has also proved to be a very advantageous.

In a product in accordance with the invention it has further proved to be advantageous if the second transmission coil, which is associated with the second door and the second activation device, is associated, in addition, with a further second activation device, which in its turn is associated with a further second door. In practice, this has also proved to be very advantageous.

It has proved to be particularly advantageous for a product in accordance with the invention if the product is a motor vehicle and the first door is the driver's door of the motor vehicle.

In a product in accordance with the invention as defined in the preceding paragraph it has further proved to be particularly advantageous if the product is a motor vehicle and the first door is the driver's door of the motor vehicle and the second door is the front passenger's door.

The above-mentioned as well as further aspects of the invention will become apparent from the embodiments described hereinafter by way of examples and will be elucidated with reference to these embodiments.

BRIEF DESCRIPTION OF THE DRAWING

The invention will now be described in more detail with reference to four embodiments which are shown in the drawings but to which the invention is not limited.

DESCRIPTION OF THE PREFERRED EMBODIMENTS

Figure 1:
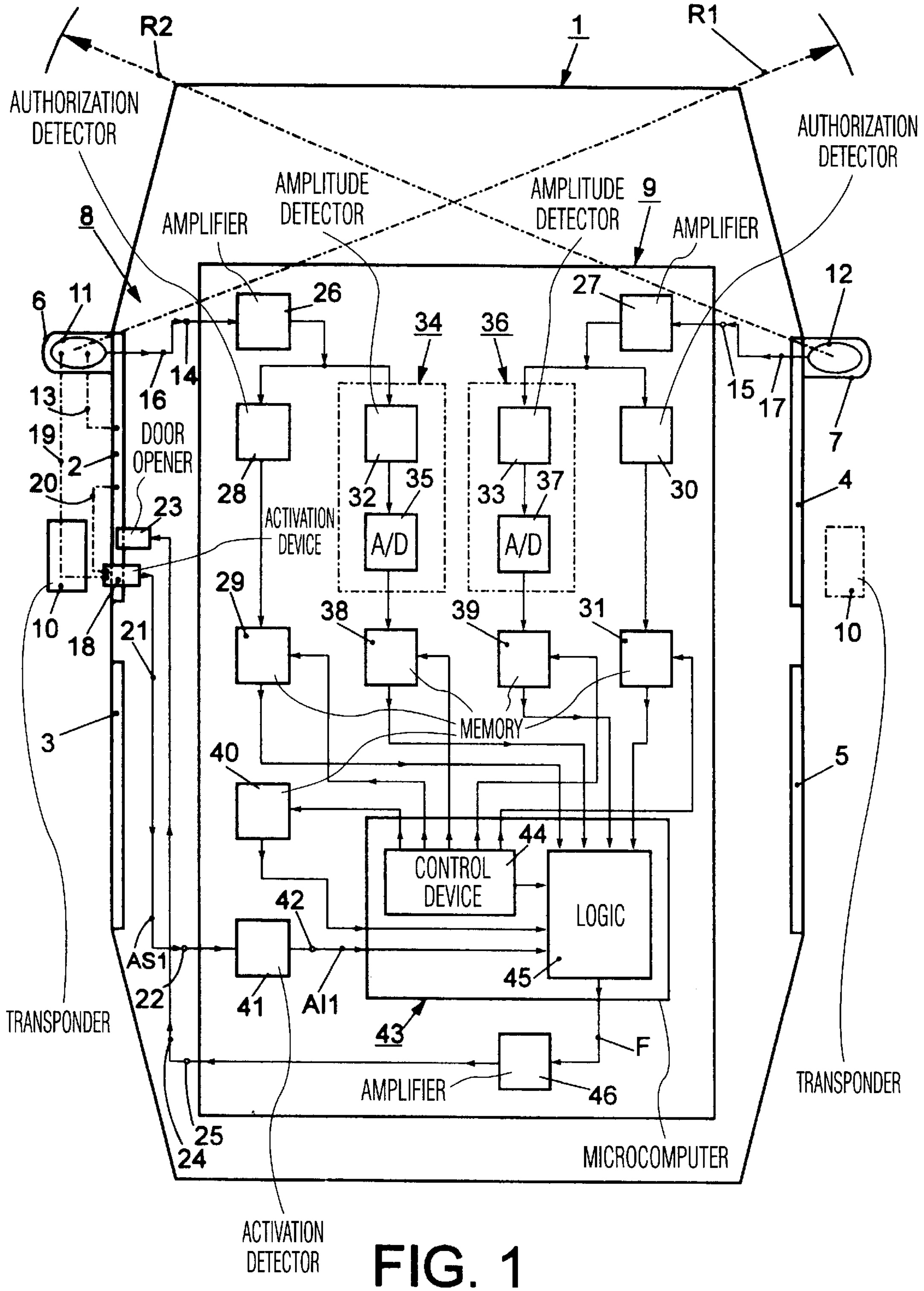
FIG. 1 diagrammatically shows a product in accordance with a first embodiment of the invention, which takes the form of a motor vehicle and includes an access control system in accordance with a first embodiment of the invention, which comprises a first transmission coil associated with the driver's door and a first activation device associated with the driver's door.

FIG. 1 shows a motor vehicle 1 in a highly diagrammatical manner. The motor vehicle 1 has a driver's door 2, a left-hand rear door 3, a front passenger's door 4 and a right-hand rear door 5. The motor vehicle 1 further has a left-hand rearview mirror secured to the driver's door 2 and a right-hand rearview mirror 7 secured to the front passenger's door.

The motor vehicle 1 further comprises an access control system 8. By means of the access control system 8 it is possible to control the access to the passenger compartment in the motor vehicle 1 via the driver's door 2 in the motor vehicle 1 shown in FIG. 1.

The access control system 8 of the motor vehicle 1 comprises a transponder-communication device 9 designed for the contactless communication with at least one transponder 10, which transponder controls the access authorization through the driver's door 2 by means of authorization information. Such a transponder 10, which takes the form of a card, is shown diagrammatically in solid lines in FIG. 1 adjacent the driver's door 2. Furthermore, such a transponder 10 is shown diagrammatically in dash-dot lines in FIG. 1 adjacent the front passenger's door 4.

The access control system 8 further comprises two transmission coils 10 each having a given receiving range. The first transmission coil 11 is mounted in the left-hand rearview mirror 6 and the second transmission coil 12 is mounted in the right-hand rearview mirror 7. The two transmission coils 11 and 12 are each adapted to receive transponder signals which each contain at least one type of authorization information. The first transmission coil 11 is associated with the driver's door 2, as is indicated by a dash-dot line 13. Both transmission coils 11 and 12 are electrically connected to the transponder-communication device 9, as is shown diagrammatically in FIG. 1, by a respective electrically conductive connection 16 or 17, which leads to a first input 14 or to a second input 15, respectively, of the transponder communication device 9. The transponder-communication device 9 is adapted to detect identification information representing at least a part of a received transponder signal, as will be described in more detail hereinafter.

The access control system 8 further comprises a first activation device 18 which can be activated by an authorized person. In a manner not shown, the first activation device 18 includes a hand-actuated door handle of the driver's door 2 and a switch, not shown, which is coupled to the door handle of the driver's door 2 and is switched over upon actuation of the door handle of the driver's door 2, upon which said switch supplies a first activation signal AS1. The first activation device 18 is associated with the first transmission coil 11 and the driver's door 2, as is shown diagrammatically by dash-dot lines 19 and 20, respectively, in FIG. 1. By means of the first activation device 18 the access via the associated driver's door 2 can be gained by actuation of this device, i.e. by actuation of the door handle of the driver's door 2, upon which the first activation device 18 generates the first activation signal AS1. The first activation device 18 is electrically connected to the transponder communication device 9 via an electrically conductive connection 21, shown diagrammatically, which leads to an input 2 of the transponder communication device 9.

The access control system 8 further comprises a first door opener 23 for the driver's door 2. By means of the first door opener 23 the door lock of the driver's door 2 can be actuated so as to open this door. The first door opener 23 can be activated by means of the transponder communication device 9. For this purpose, the first door opener 23 is connected to an output 25 of the transponder communication device 9 via an electrically conductive connection 24, shown diagrammatically.

In the motor vehicle 1, i.e. in its access control system 8, the two transmission coils 11 and 12 are advantageously constructed in such a manner that they have an arbitrarily large receiving range. In FIG. 1 the receiving range of the first transmission coil 11 is represented diagrammatically as a dash-dot arrow having a length R1. In FIG. 1 the receiving range of the second transmission coil 11 is represented diagrammatically as a dash-dot arrow having a length R2. Owing to their comparatively large receiving ranges both transmission coils 11 and 12 are capable of receiving a transponder signal supplied by a transponder 10 situated near the driver's door 2. Since the transponder 10 located near the driver's door 2 is situated at different distances from the first transmission coil 11 and from the second transmission coil 12, a transponder signal supplied by this transponder 10 is received with a larger amplitude by the first transmission coil 11 than by the second transmission coil 12.

As already stated hereinbefore, the transponder communication device 9, which is electrically connected to the two transmission coils 11 and 12, can detect identification information representing at least a part of a received transponder signal. In the present case of the motor vehicle 1 shown in FIG. 1 the authorization information contained in a received transponder signal can be detected as the first identification information. Moreover, in the present case, the transponder communication device 9 is capable of detecting second identification information representing a received transponder signal, which will be described in more detail hereinafter.

To detect the first identification information and the second identification information the transponder-communication device 9 comprises a first amplifier 26 connected to the first input 14 and a second amplifier 27 connected to the second input 15. Both amplifiers amplify the transponder signals supplied by the transmission coils 11 and 12.

The first amplifier 26 is followed by a first authorization information detector 28 by means of which the authorization information contained in a transponder signal, which information is formed for example by a code, can be determined or detected. Authorization information detected by means of the first authorization information detector 28 can be stored as first identification information in a first authorization information memory 29 which follows the first authorization information detector 28.

The second amplifier 27 is followed by a second authorization information detector 30 by means of which it is likewise possible to detect or determine the authorization information contained in a transponder signal. Authorization information detected by means of the second authorization information detector 30 can be stored as further first identification information in a second authorization information memory 31 which follows the second authorization information detector 30.

In the transponder communication device 9 in the motor vehicle 1 shown in FIG. 1, i.e. in the access control system 8 of this motor vehicle, the first amplifier 26 is now advantageously followed by a first amplitude detector 32 and the second amplifier 27 by a second amplitude detector 33. By means of the two amplitude detectors 32 and 33 the amplitudes of the transponder signals supplied by the two transmission coils 11 and 12 can be determined. The first amplitude detector 32 forms part of first amplitude detection means 34, which in addition to the first amplitude detector 32 also include a first analog-to-digital converter 35. The second amplitude detector 33 forms part of second amplitude detection means 36, which in addition to the first amplitude detector 33 also include a second analog-to-digital converter 37. By means of the two analog-to-digital converters 35 and 37 the analog detection signals supplied by the two amplitude detectors 32 and 33 can each be converted into amplitude information corresponding to a detected amplitude of a respective transponder signal. The amplitude information which can be generated and supplied by means of the two analog-to-digital converters 35 and 37 forms second identification information already mentioned hereinbefore. The respective amplitude information forming second identification information can be stored in a respective amplitude information memory 38 or 39. The first amplitude information memory 38 follows the first analog-to-digital converter 35 and the second amplitude information memory 39 follows the second analog-to-digital converter 37.

The transponder-communication device 9 further includes a reference authorization information memory 40, which can store or stores reference authorization information.

The transponder communication device 9 further includes a first activation detector 41, to which the first activation signal AS1 supplied by the first activation device 18 can be applied via the input 22 of the transponder communication device 9. When a first activation signal AS1 is received, this is detected by means of the first activation detector 41, after which the first activation detector 41 makes first activation information AI1 available on its output 42.

The transponder-communication device 9 further includes a microcomputer 43. By means of the microcomputer 43 a control device 44 is realized, by means of which the two authorization information memories 29 and 31, the reference authorization information memory 40 and the two amplitude information memories 38 and 39 can be controlled so as to read the information stored in them. Moreover, a logic device 45 is realized by means of the microcomputer 43, which device can also be controlled by the control device 44 and, when identification information representing at least a apart of a transponder signal received by the first transmission coil 11 and first activation information AI1 are received, enables the first door opener 23 of the driver's door 2 to be activated.

The logic device 45 realized by means of the microcomputer 43 is arranged after the amplitude detection means 34 and 36. In this way the amplitude information, generated by the amplitude detection means 34 and 36 and stored in the two amplitude information memories 38 and 39, can be applied to the logic device 45 as second identification information. The logic device 45 is adapted to detect a condition in which the amplitude of the transponder signal supplied by the first transmission coil 11 is greater than the amplitude of the transponder signal supplied by the second transmission coil 12. The first door opener 23 of the driver's door 2 can be activated only by means of the logic device 45 when said condition has been detected. For this activation the logic device 45 of the microcomputer 43 of the transponder communication device 9 supplies enable information F to an amplifier 46, preferably in encrypted form. The amplifier 46 applies the amplified and, if necessary converted, enable information F to the first door opener 23 via the output 25 of the transponder communication device 9 and the electrically conductive connection 24, causing the first door opener 23 to be activated, upon which the driver's door 2 of the motor vehicle 1 is opened by means of the first door opener 23.

When in the motor vehicle 1 shown in FIG. 1, for example the driver, who wears a transponder 10 in his clothing, approaches the motor vehicle 1 in the area of the driver's door 2 and subsequently activates the first activation device 18 by actuating the door handle of the driver's door 2, the activation of the first activation device 18 is detected by means of the first activation detector 41, which subsequently makes first activation information AI1 available on its output 42 and, moreover, the transponder 10 situated in the proximity of the driver's door 2 supplies a transponder signal containing authorization information—in response to an appropriate request from the transponder communication device 9, which will not be described any further here because it is not relevant in the present case—which transponder signal is received both by the first transmission coil 11 and by the second transmission coil 12, because the transponder 10 is disposed both in the receiving range of the first transmission coil 11 and in the receiving range of the second transmission coil 12.

The transponder signals received with different amplitudes by the two transmission coils 11 and 12 are applied to the two authorization information detectors 28 and 30 and the two amplitude detectors 32 and 33 via the two amplifiers 26 and 27. By means of the two authorization information detectors 28 and 30 the authorization information contained in the received transponder signals is detected, the information received by both detectors being obviously the same because it originates from the same transponder 10. The detected authorization information is stored in the authorization information memories 29 and 31 as first identification information. By means of the two amplitude detectors 32 and 33 the amplitudes of the received transponder signals are detected. Since the transponder 10 is situated at the location of the driver's door 2 the first amplitude detector 32 will detect a larger amplitude than the second amplitude detector 33. The detected amplitude values are applied to the two analog-to-digital converters 35 and 37, by means of which they are converted into digital amplitude information, which is stored in the amplitude information memories 38 and 39 as second identification information.

Subsequently, the control device 44 realized by means of the microcomputer 43 supplies control signals to the two authorization information memories 29 and 31, to the reference authorization information memory 40, the two amplitude information memories 38 and 39, and to the logic device 51, so as to load the information stored in these memories 29, 31, 40, 38 and 39 into the logic device 45. Likewise, the first activation information AI1 available on the output 42 of the first activation detector 41 is loaded into the logic device 45.

In the present case the logic device 45 detects firstly that first activation information AI1 has been received, i.e. the first activation device 18 has been activated, secondly that the detected authorization information received from the authorization information memories 29 and 31 as identification information corresponds to reference authorization information received from the reference authorization information memory 40, and thirdly that the amplitude information received from the first amplitude information memory 38 as second identification information represents an amplitude of the transponder signal supplied by the first transmission coil 11 larger than the amplitude of the transponder signal supplied by the second transmission coil 12 and which is represented by the amplitude information received from the second amplitude information memory 39 as second identification information. After the three aforementioned conditions have been detected, which must be satisfied for authorized access to the motor vehicle 1, the logic device 45 supplies the enable information F to the amplifier 46, via which the enable information F is applied to the first door opener 23, upon which the first door opener 23 opens the driver's door 2 of the motor vehicle 1.

When a person authorized to use the motor vehicle 1 is in the proximity of the front passenger's door 4, so that the transponder 10 carried by this person is in the position near the front passenger's door 4 as shown in dash-dot lines in FIG. 1, and at the same time an unauthorized person, for example a thief, activates the first activation device 18 by actuation of the door handle of the driver's door 2, this has the advantage that it does not result in the driver's door 2 being opened. This is because in this case the first activation detector 41 produces first activation information AI1 on its output 41, which information is available to the logic device 45, and secondly authorization information from the two authorization information memories 29 and 31, corresponding to the reference authorization information stored in the reference authorization information memory 40, is available to the logic device 45, but thirdly the second amplitude detector 33 detects a larger amplitude than the first amplitude detector 32 and, consequently, the second amplitude information memory 39 makes amplitude information representing a larger amplitude value than that from the first amplitude information memory 38 available to the logic device 45. However, since a requirement for authorized access to the motor vehicle 1 is that the amplitude information supplied by the first amplitude information memory 38 should represent a larger amplitude value than the amplitude information supplied by the second amplitude information memory 39, this is detected by means of the logic device 45, as a result of which the logic device 45 does not supply enable information F and, as a consequence, the first door opener 23 does not open the driver's door 2.

With the motor vehicle 1 shown in FIG. 1 it is advantageously achieved by very simple means and substantially without any additional expense—as is apparent from the above description—that the first activation device 18 arranged at the location of the door handle of the driver's door 2 and the first transmission coil 11 associated with the driver's door 2 can be situated at a comparatively large distance from the associated first activation device 18, namely inside the rearview mirror 6 and that, in addition, a comparatively free choice of the relative position of the first transmission coil 11 with respect to its associated first activation device 18 is achieved because the receiving range of the first transmission coil 18 can be substantially arbitrarily large. Thus, for a trouble-free and reliable control of the access to the motor vehicle 1 it is not necessary to limit the receiving range of the first transmission coil in any way, which is beneficial for an unproblematic construction of the first transmission coil 18.

Figure 2:
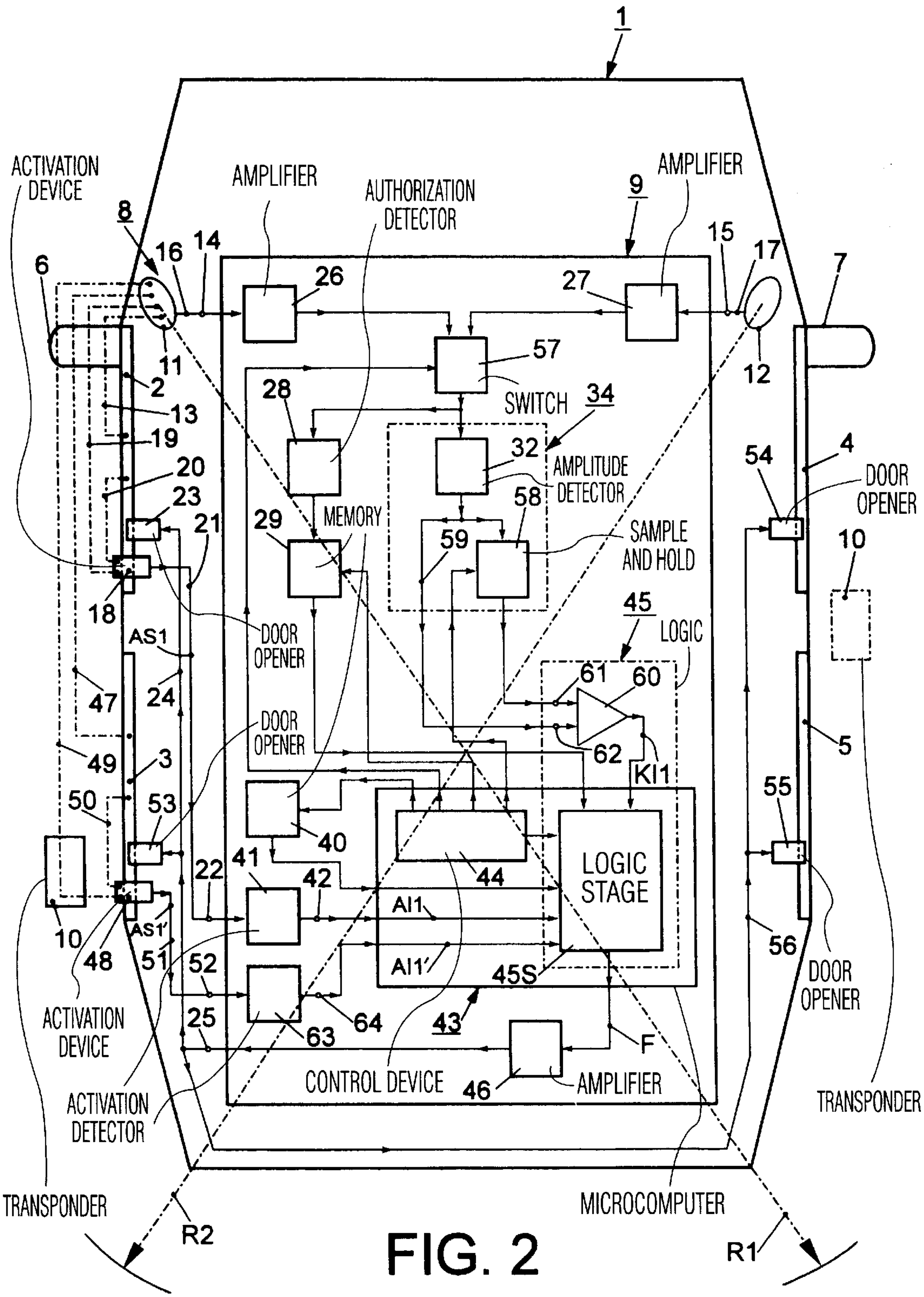
FIG. 2 in a manner similar to FIG. 1, shows a product in accordance with a second embodiment of the invention, which also takes the form of a motor vehicle and includes an access control system in accordance with a second embodiment of the invention, which comprises a first transmission coil associated with the driver's door and with a left-hand rear door to the rear of the driver's door, a first activation device associated with the driver's door and a further first activation device associated with the left-hand rear door.

FIG. 2 also shows a motor vehicle 1 in a highly diagrammatic manner. The motor vehicle 1 shown in FIG. 2 includes an access control system 8 by means of which the access through all the four doors of the motor vehicle 1, i.e. through the driver's door 2, through the left-hand rear door 3, through the front passenger's door 4 and through right-hand rear door 5, can be controlled.

The access control system 8 also includes a transponder communication device 9 and two transmission coils 11 and 12, each having a given receiving range. In the present case the two transmission coils 11 and 12 are arranged on the windshield of the motor vehicle 1. The first transmission coil 11 is associated with the driver's door 2 and the left-hand rear 3, as is indicated by the dash-dot line 13 and by a further dash-dot line 47.

The access control system 8 further comprises a first activation device 18, which can be activated by an authorized person, and a further first activation device 48, which can likewise be activated by an authorized person. The two first activation devices 18 and 48 are associated with the first transmission coil 11, as is indicated by means of the dash-dot line 19 and a further dash-dot line 49. The first activation device 18 is associated with the driver's door 2, as is indicated by the dash-dot line 20, and the further first activation device 48 is associated with the left-hand rear door 3, as is indicated by a further dash-dot line 50. Access through the four doors 2, 3, 4 and 5 of the motor vehicle 1 can be initiated by means of the two activation devices 18 and 48, namely by actuating these devices, i.e. by actuating the door handle of the driver's door 2 or the door handle of the left-hand rear door 3. Upon actuation of the first activation device 18 this device generates the first activation signal AS1. Upon actuation of the further first activation device 48 this device generates a further first activation signal AS1'. The two activation devices 18 and 48 are electrically connected to the transponder communication device 9. The first activation device 18 is electrically connected to the transponder communication device 9 via the electrically conductive connection 21, which is shown diagrammatically and leads to the input 22 of the transponder communication device 9, and the further first activation device 48 is electrically connected to the transponder communication device 9 via an electrically conductive connection 51, which leads to a further input 52 of the transponder communication device 9.

The access control system 8 of the motor vehicle 1 shown in FIG. 2 further includes the first door opener 23 for the driver's door 2, a further first door opener 53 for the left-hand rear door 3, a second door opener 54 for the front passenger's door 4, and a further second door opener 55 for the right-hand rear door 5. In order to open these doors the first door opener 23 can actuate the door lock for the driver's door 2, the further first door opener 53 can actuate the left-hand rear door 3, the second door opener 54 can actuate the door lock of the front passenger's door 4 and the further second door opener 55 can actuate the door lock of the right-hand rear door 55. All the door openers 23, 53, 54 and 55 can be actuated by means of the transponder communication device 9. For this purpose, the first door opener 23 and the further first door opener 53 are connected to the output 25 of the transponder communication device 9 via the electrically conductive connection 24 and the second door opener 54 and the further second door opener 55 are connected to this output via a further electrically conductive connection 56.

In the motor vehicle 1 shown in FIG. 2, i.e. in its access control system 8, the two transmission coils 11 and 12 are also advantageously constructed in such a manner that they have arbitrarily large receiving ranges. In FIG. 2 the receiving range of the first transmission coil 11 is represented diagrammatically as a dash-dot arrow of the length R1. In FIG. 2 the receiving range of the second transmission coil 12 is represented diagrammatically as a dash-dot arrow of the length R2. Owing to the different distances from this transponder 10 to the first transmission coil 11 and to the second transmission coil 12 a transponder signal supplied by a transponder 10 situated for example in the area of the left-hand rear door 3 is received by the first transmission coil 11 with a greater amplitude than by the second transmission coil 12.

In the motor vehicle 1 shown in FIG. 2 the transponder communication device 9, which is electrically connected to the two transmission coils 11 and 12, is likewise capable of detecting authorization information contained in a received transponder signal as first identification information and amplitude information representing the received amplitude of the transponder signal as second identification information.

To detect the first identification information and the second identification information the transponder communication device 9 has the first amplifier 26 connected to the input 14 and the second amplifier 27 connected to the input 15. In the present case the two amplifiers 26 and 27 are followed by a switching device 57, which can be switched over under control of the control device 44. The switching device 57 is followed, in the first place, by the first authorization information detector 28, which is followed by the first authorization information memory 29, and, in the second place, by first amplitude detection means 34, which comprise the first amplitude detector 32, a sample-and-hold stage 58 following the first amplitude detector 32, and a connecting lead 59 arranged after the first amplitude detector 32 and in parallel with the sample-and-hold stage 58. The sample-and-hold stage 58 can be controlled by the control device 44.

The first amplitude detection means 34 is followed by the logic device 45. In the transponder communication device 9 of the motor vehicle 1 of FIG. 2 the logic device 45 comprises a comparator 60 and a logic device 45S, which follows the comparator 60 and is realized by means of the microcomputer 43. The comparator 60 has a first input 61 connected to the output of the sample-and-hold stage 58 and has a second input 62 connected to the connecting lead 59.

The transponder communication device 9 further includes the first activation detector 41, to which the first activation signal AS1 supplied by the first activation device 18 can be applied via the input 22 of the transponder communication device 9 and which makes the first activation information AI1 available upon receipt of a first activation signal AS1. The transponder communication device 9 further comprises a further first activation detector 63, to which the further first activation signal AS1' supplied by the further first activation device 48 can be applied via the input 52 of the transponder communication device 9 and which makes the further first activation information AI1' available on its output 64 upon receipt of a further first activation signal AS1'.

As already stated hereinbefore, the logic device 45, which in the present case is realized only partly by means of the microcomputer 53, follows the first amplitude detection means 34. Thus, in the motor vehicle 1 of FIG. 2 it is also possible to apply the amplitude information generated by the first amplitude detection means 34 to the logic device 45 as second identification information. In the present case the logic device 45 is likewise adapted to detect a condition in which the amplitude of the transponder signal supplied by the first transmission coil 11 is greater than the amplitude of the transponder signal supplied by the second transmission coil 12. The four door openers 23, 53, 54 and 55 for the four doors 2, 3, 4 and 5 of the motor vehicle 1 can be activated only by means of the logic device 45 when said condition has been detected.

When in the motor vehicle 1 shown in FIG. 2, an authorized person, who wears a transponder 10 in his clothing, approaches the motor vehicle 1 in the area of the left-hand rear door 3 and subsequently activates the further first activation device 48 by actuating the door handle of the left-hand rear door 3, the activation of the further first activation device 48 is detected by means of the further first activation detector 63, which subsequently makes further first activation information AI1' available on its output 64 and, moreover, the transponder 10 situated in the proximity of the left-hand rear door 3 supplies a transponder signal containing authorization information—in response to an appropriate request from the transponder communication device 9, which will not be described any further here because it is not relevant in the present case—which transponder signal, since the transponder 10 is disposed both in the receiving range of the first transmission coil 11 and in the receiving range of the second transmission coil 12, is received both by the first transmission coil 11, which is arranged in the area of the wind shield at the side of the driver's door, and by the second transmission coil 12, which is arranged in the area of the wind shield at the side of the front passenger's door, the transponder signal being received by the transmission coil 11 with a greater amplitude than by the second transmission coil 12.

The transponder signals received with different amplitudes by the two transmission coils 11 and 12 are applied to the switching device 57 via the two amplifiers 26 and 27. At a given instant the control device 44 sets the switching device 57 to a switching state in which the first amplifier 26 is connected to the first authorization information detector 28 and to the first amplitude detection means 34. By means of the first authorization information detector 28 the authorization information contained in the transponder signal received by the first transmission coil 11 is detected. The detected authorization information is subsequently stored as first identification information in a given storage location in the first authorization information memory 29 under control of the control device 44. Furthermore, by means of the first amplitude detector 32 the amplitude of the transponder signal received by the first transmission coil 11 is detected. The detected analog amplitude value is applied to the sample-and-hold stage 58, which samples this analog amplitude value under control of the control device and makes it available as second identification information for the following comparator 60. At another given instant, the control device 44 subsequently sets the switching device 57 to a switching state in which the second amplifier 27 is connected to the first authorization information detector 28 and to the first amplitude detection means 34. By means of the first authorization information detector 28 the authorization information contained in the transponder signal received by the first transmission coil 12 is detected, which information obviously corresponds to the authorization information contained in the transponder signal received by the first transmission coil 11 detector because in both cases the authorization information originates from the same transponder 10. The authorization information contained in the transponder signal received by the second transmission coil 12 and detected by means of the first authorization information detector 28 is likewise stored as further first identification information in another given storage location in the first authorization information memory 29 under control of the control device 44. Moreover, the amplitude of the transponder signal received by the second transmission coil 12 is detected by means of the first amplitude detector 32. The detected amplitude is applied directly to the second input 62 of the comparator 60 via the connecting lead 49 as second identification information. The comparator 60 compares the two amplitude values applied to its two inputs 61 and 62 as second identification information and ascertains that the amplitude value applied to the first input 61 is larger than the amplitude value applied to the second input 62, after which the comparator 60 generates first comparator information KI1 and supplies it to its output.

Subsequently, the control device 44 realized by means of the microcomputer 43 supplies control signals to the first authorization information memory 29, to the reference information memory 40, and to the logic stage 45S of the logic device 45, as a result of which the authorization information stored in different storage locations in the first authorization information memory 29 as first identification information and the first comparator information KI1 into the logic stage 45S. Likewise, the further first activation information AI1' available on the output 64 of the further first activation detector 63 is loaded into the logic stage 45S of the logic device 45.

In the present case the logic device 45 detects firstly that further first activation information AI1' has been received, i.e. the further first activation device 48 has been activated, secondly that the detected authorization information received from the first authorization information memory 29 as first identification information corresponds to reference authorization information received from the reference authorization information memory 40, and thirdly that a first comparator signal KI1 has been received, i.e. that the amplitude of the transponder signal supplied by the first transmission coil 11 larger than the amplitude of the transponder signal supplied by the second transmission coil 12. After the three afore-mentioned conditions have been detected, which conditions must be satisfied for authorized access to the motor vehicle 1, the logic stage 45S of the logic device 45 supplies enable information F to the amplifier 46, via which the enable information F is applied to the all the door openers 23, 53, 54 and 55, upon which the four door openers 23, 53, 54 and 55 opens the four doors 2, 3, 4 and 5 of the motor vehicle 1.

When a person authorized to use the motor vehicle 1 of FIG. 2 is in the proximity of the right-hand side of the motor vehicle 1, approximately at the location of the right-hand rear door 5, so that the transponder 10 carried by this person is then in the position near the right-hand rear door 5 as shown in dash-dot lines in FIG. 2, and at the same time an unauthorized person, for example a thief, activates the first activation device 18 or the further first activation device 48 by actuation of the door handle of the driver's door 2 or the door handle of the left-hand rear door 3, this has the advantage that it does not result in the four doors 2, 3, 4 and 5 of the motor vehicle 1 being opened. This is on the same grounds as explained hereinbefore for the motor vehicle 1 shown in FIG. 1.

The motor vehicle 1 shown in FIG. 2 also has the advantages already mentioned with reference to the motor vehicle 1 shown in FIG. 1.

Figure 3:
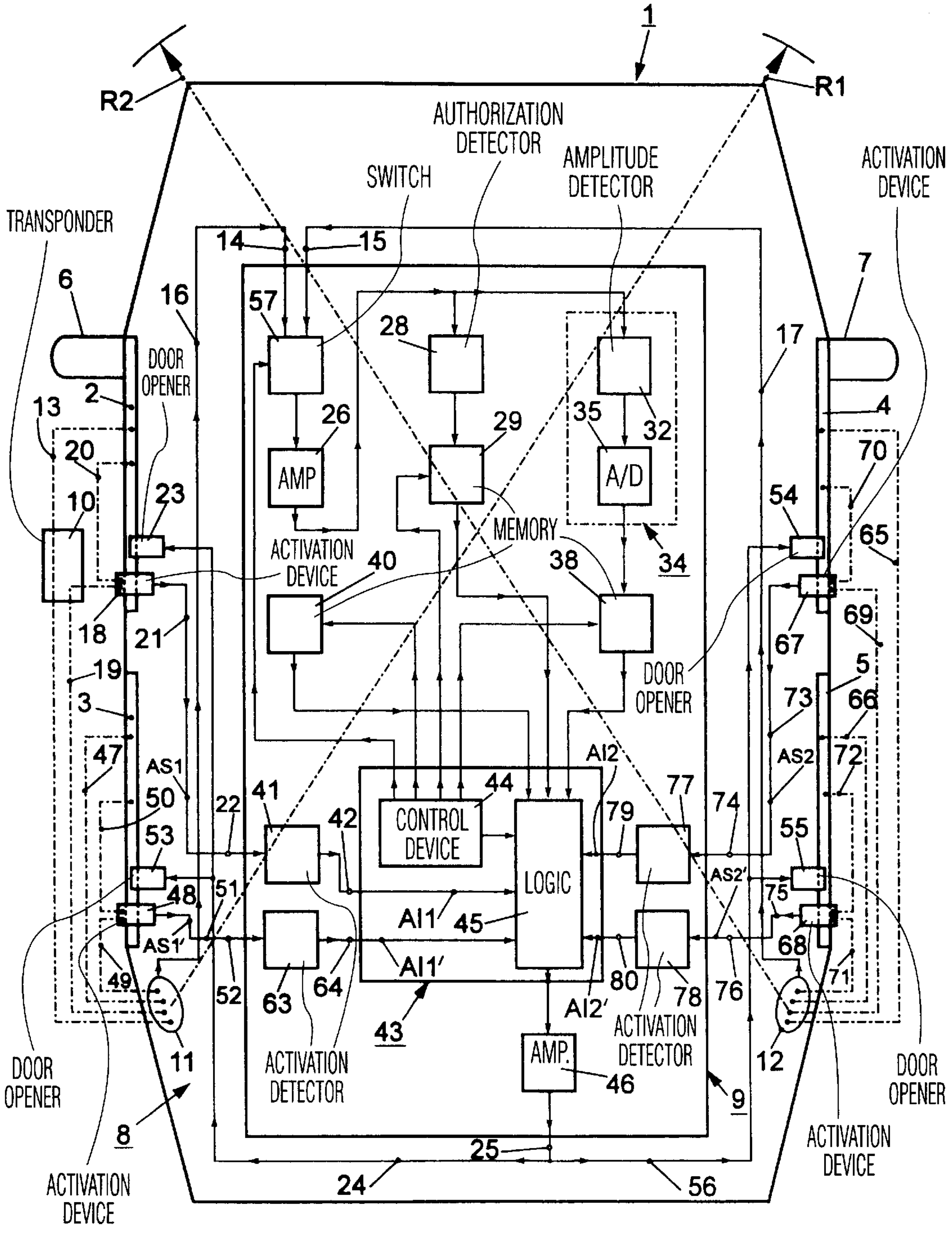
FIG. 3 in a manner similar to FIGS. 1 and 2, shows a product in accordance with a third embodiment of the invention, which also takes the form of a motor vehicle and includes an access control system in accordance with a third embodiment of the invention, which comprises a first transmission coil associated with the driver's door and with the left-hand rear door, a second transmission coil associated with the front passenger's door and the right-hand rear door, a first activation device associated with the driver's door, a further first activation device associated with the left-hand rear door, a second activation device associated with the front passenger's door, and a further second activation device associated with the right-hand rear door.

FIG. 3 shows a further motor vehicle 1 in a highly diagrammatic manner. The motor vehicle 1 shown in FIG. 2 includes an access control system 8 by means of which the access through all the four doors 2, 3, 4 and 5 to the passenger compartment in the motor vehicle 1 can be controlled. The access control system 8 of the motor vehicle 1 shown in FIG. 3, similarly to the access control systems 8 of the two motor vehicles 1 shown in FIGS. 1 and 2, also includes a transponder communication device 9 for the contactless communication with at least one transponder 10 which controls the access authorization for the four doors 2, 3, 4 and 5 by means of authorization information.

The access control system 8 of the motor vehicle 1 shown in FIG. 3 includes two transmission coils 11 and 12, each having a given receiving range. In the present case the two transmission coils 11 and 12 are arranged on the windshield of the motor vehicle 1, as indicated only diagrammatically in FIG. 3. In the present case, the two transmission coils 11 and 12 are again adapted to receive transponder signals which each contain at least one type of authorization information. The first transmission coil 11 is associated with the driver's door 2 and the left-hand rear 3, as is indicated by the dash-dot lines 13 and 47. In the present case the second transmission coil is associated with the front passenger's door 4 and the right-hand rear door 5, as is indicated by the two further dash-dot lines 65 and 66. Both transmission coils 11 and 12 are electrically connected to, respectively, the first input 14 and the second input 15 of the transponder-communication device 9 by an electrically conductive connection 16 or 17, respectively.

The access control system 8 of the motor vehicle 1 shown in FIG. 3 further comprises a first activation device 18, which can be activated by an authorized person, and a further first activation device 48, which can likewise be activated by an authorized person. By means of these two first activation devices 18 and 48 the two first activation signals AS1 and AS1' can be generated. The first activation device 18 is associated with the first transmission coil 11 and the driver's door 2, and the further first activation device 48 is also associated with the transmission coil 11 and the left-hand rear door 3, as is indicated by respective dash-dot lines 19, 20, 49 and 50. The access control system 8 further comprises a second activation device 67 and a further second activation device 68, which can be activated by an authorized person. The second activation device 67 is associated with the second transmission coil 12 and the front passenger's door 4, as is indicated diagrammatically by the two further dash-dot lines 69 and 70 in FIG. 3. The further second activation device 68 is associated with the second transmission coil 12 and the right-hand rear door 5, as is indicated diagrammatically by the two further dash-dot lines 71 and 72 in FIG. 3. Access through the four doors 2, 3, 4 and 5 of the motor vehicle 1 can be initiated by means of all four activation devices 18, 48, 67 and 68. In the same way as upon actuation of the first activation device 18 a first activation signal AS1 is generated and upon actuation of the further first activation device 48 a further first activation signal AS1' is generated, a second activation signal AS2 is generated upon actuation of the second activation device 67 and a further second activation signal AS2' is generated upon actuation of the further second activation device 68. The four activation devices 18, 48, 67 and 68 are electrically connected to the transponder communication device 9, the first activation device 18 being connected via the connection 21, which leads to the input 22 of the transponder communication device 9, the further first activation device 48 being connected via the further connection 51, which leads to the input 52 of the transponder communication device 9, the second activation device 67 being connected via the connection 73, which leads to a further input 74 of the transponder communication device 9, and the further second activation device 68 being connected via a further connection 75, which leads to a further input 76 of the transponder communication device 9.

Similarly to the motor vehicle 1 shown in FIG. 2, the access control system 8 of the motor vehicle 1 shown in FIG. 3 also includes four door openers 23, 53, 54 and 55 for the four doors 2, 3, 4 and 5 of the motor vehicle 1.

In the motor vehicle 1 shown in FIG. 3, i.e. in its access control system 8, the two transmission coils 11 and 12 are also advantageously constructed in such a manner that they have arbitrarily large receiving ranges. In FIG. 3 the receiving range of the first transmission coil 11 is represented diagrammatically as a dash-dot arrow of the length R1. In FIG. 3 the receiving range of the second transmission coil 12 is represented diagrammatically as a dash-dot arrow of the length R2. Both transmission coils 11 and 12 can receive a transponder signal supplied by, for example, a transponder 10 situated near the driver's door 2, a transponder signal supplied by said transponder 10 being received by the first transmission coil 11 with a greater amplitude than by the second transmission coil 12 owing to the different distances from this transponder 10, which is situated near the driver's door 2, to the first transmission coil 11 and to the second transmission coil 12.

With respect to the transponder communication device 9 of the access control system 8 of the motor vehicle 1 shown in FIG. 3 it is to be noted that the switching device 57 is connected to the two inputs 14 and 15, the switching device 57 being followed only by the first amplifier 26. In the present case the first amplifier 26 is, in the first place, followed by the first authorization information detector 28 and the first authorization information memory 29, and, in the second place, by the first amplitude detection means 34, which comprise the first amplitude detector 32 and the first analog-to-digital converter 35 following the first amplitude detector 32. The first amplitude detection means 34 are followed by the first amplitude information memory 38. The switching device 57 can be switched over under control of the control device 44. Depending on the switching state of the switching device 57 the control device 44 can also control the first authorization information memory 29 and the first amplitude information memory 38 to load the respective authorization information, which forms first identification information, and the respective amplitude information, which forms second identification information, into different storage locations of the two memories 29 and 38.

The transponder communication device 9 in the motor vehicle 1 shown in FIG. 3 includes, in addition to the first activation detector 41 and the further first activation detector 63, a second activation detector 77 and a further second activation detector 78. The second activation detector 77 is arranged after the input 74 of the transponder communication device 9 and the further second activation detector 78 is arranged after the further input 76 of the transponder communication device 9. Upon receipt of a second activation signal AS2 this is detected by means of the second activation detector 77, after which the second activation detector 77 makes second activation information AI2 available on its output 79. Upon receipt of a further second activation signal AS2' this is detected by the further second activation detector 78, after which the further second activation detector 78 makes further second activation information AI2' available on its output 80.

As is apparent from FIG. 3, the logic device 45, which in the motor vehicle 1 is also realized by means of the microcomputer 53, follows the first amplitude detection means 34. Thus, it is also possible to apply the amplitude information generated by the first amplitude detection means 34 and stored in the first amplitude information memory 38 to the logic device 45 as second identification information. In the present case the logic device 45 is likewise adapted to detect a condition in which the amplitude of the transponder signal supplied by the first transmission coil 11 is greater than the amplitude of the transponder signal supplied by the second transmission coil 12. The four door openers 23, 53, 54 and 55 for the four doors 2, 3, 4 and 5 of the motor vehicle 1 can be activated only by means of the logic device 45 when said condition has been detected.

When in the motor vehicle 1 shown in FIG. 3, for example the driver, who wears a transponder 10 in his clothing, approaches the motor vehicle 1 in the area of the driver's door 2 and subsequently activates the first activation device 18 by actuating the door handle of the driver's door 2, the activation of the first activation device 18 is detected by means of the first activation detector 41, which subsequently makes first activation information AI1 available on its output 42 and, moreover, the transponder 10 situated in the proximity of the driver's door 2 supplies a transponder signal containing authorization information—in response to an appropriate request from the transponder communication device 9, which will not be described any further here because it is not essential in the present case—which transponder signal, since the transponder 10 is disposed both in the receiving range of the first transmission coil 11 and in the receiving range of the second transmission coil 12, is received both by the first transmission coil 11 and by the second transmission coil 12 the transponder signal being received by the first transmission coil 11 with a greater amplitude than by the second transmission coil 12.

The transponder signals received with different amplitudes by the two transmission coils 11 and 12 are applied to the switching device 57, which is controllable by the control device 44. As the operating sequence proceeds, the control device 44 sets the switching device 57 to a switching state in which the first input 14 is connected to the first amplifier 26, as a result of which, in the same way as in the motor vehicles 1 described hereinbefore with reference to FIGS. 1 and 2, the first authorization information detector 28 detects the authorization information contained in the transponder signal received by the first transmission coil 11 and the first amplitude detector 32 detects the amplitude of the transponder signal received by the first transmission coil 11. The detected authorization information is subsequently stored in a given storage location in the first authorization information memory 29 under control of the control device 44 and the detected amplitude value is converted into amplitude information by means of the first analog-to-digital converter 35, which amplitude information is then also stored in a given storage location in the first amplitude information memory 38 under control of the control device 44. The control device 44 subsequently sets the switching device 57 to its other switching state in which the second input is connected to the first amplifier 26, so that the authorization information contained in the transponder signal received by the second transmission coil 12 is detected by means of the first authorization information detector 28 and the amplitude of this transponder signal is detected by means of the first amplitude detector 32. The authorization information thus detected is stored in another given storage location in the first authorization information memory 29 under control of the control device 44 and the detected amplitude is likewise converted into amplitude information by means of the first digital-to-analog converter 35 and is subsequently stored in another given storage location in the first amplitude information memory 38 under control of the control device 44.

Subsequently, under control of the control device 44, the authorization information stored as identification information in the various storage locations in the first authorization information memory 29, the amplitude information stored as second identification information in the various storage locations in the first amplitude information memory 38, the reference authorization information stored in the reference information memory 40, and the activation information AI1 available on the output 42 of the activation detector 41 are loaded into the logic device 45, and the test operations already described for the motor vehicles 1 shown in FIGS. 1 and 2 are carried out, after which the four door openers 23, 53, 54 and 55 are activated and, consequently, the four doors 2, 3, 4 and 5 are opened.

The motor vehicle 1 shown in FIG. 3 also has the advantages already described with reference to the motor vehicle 1 shown in FIG. 1.

In a motor vehicle 1 as shown in FIG. 3 a separate electrically conductive connection may be provided between the logic device 45 and each door opener 23, 53, 54 and 55, in which case each of the doors 2, 3, 4 and 5 can be opened separately by means of the associated door opener 23, 53, 54 or 55 when the activation device 18, 48, 67 or 68 associated with the respective door 2, 3, 4 or 5 is actuated.

Figure 4:
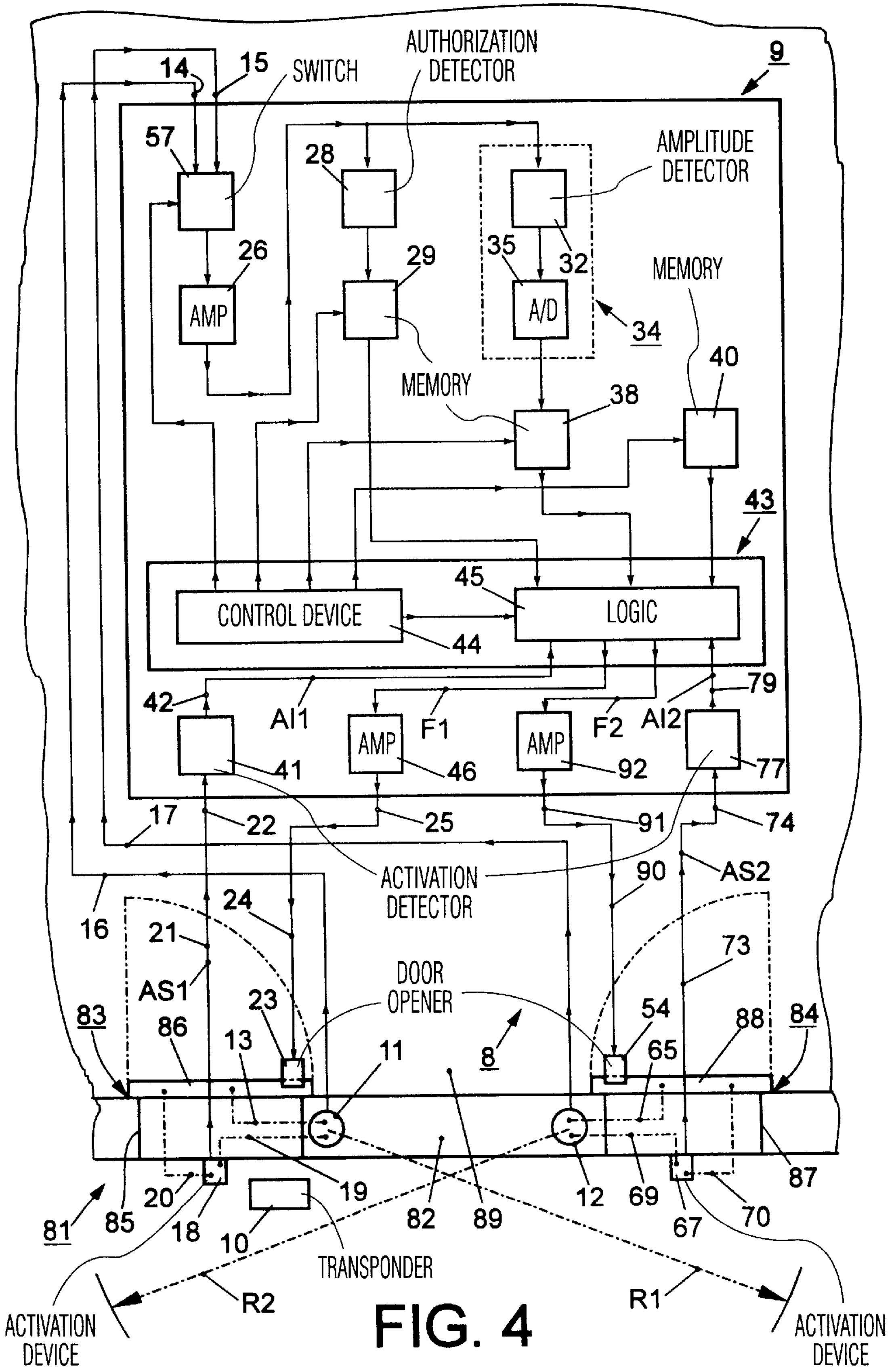
FIG. 4 shows diagrammatically a part of a product in accordance with a fourth embodiment of the invention, which product is formed by a restricted-access room in a building and which includes an access control system in accordance with a fourth embodiment of the invention, which comprises a first transmission coil associated with a first door, a second transmission coil associated with a second door, a first activation device associated with the first door, and a second activation device associated with the second door.

FIG. 4 shows diagrammatically and only partly a restricted-access room 81 of a building. Such a restricted-access room 81 can, for example, serve as a safe-deposit room. The restricted-access room 81 is bounded by walls, of which only one wall 82 is shown diagrammatically in FIG. 4. In the wall 82 there is a first door 83 and a second door 84. The first door 83 comprises a first doorway 85 and a first door panel 86 for closing the first doorway 85. The second door 84 likewise comprises a second doorway 87 and a second door panel 88 for closing the second doorway 87.

The restricted-access room 81 is equipped with an access control system 8. By means of the access control system 8 the access to the interior 89 of the restricted-access room 81 through both doors 83 and 84 can be controlled. The access control system 8 of the restricted-access room 81 includes a transponder communication device 9 adapted to provide contactless communication with at least one transponder 10 which controls the authorization for access through the two doors 83 and 84 by means of authorization information. Such a transponder 10, disposed in front of the first door 83, is shown diagrammatically in solid lines in FIG. 4.

The access control system 8 further includes two transmission coils 11 and 12, each having a given receiving range. In the present case the two transmission coils 11 and 12 are accommodated in the wall 82, i.e. the first transmission coil 11 adjacent the first doorway 85 of the first door 83 and the second transmission coil 12 adjacent the second doorway 87 of the second door 84. The first transmission coil 11 is associated with the first door 83, as is indicated by means of the dash-dot line 13. The second transmission coil 12 is associated with the second door 84, as is indicated by means of the dash-dot line 65. The two transmission coils 11 and 12 are adapted to receive transponder signals which each contain at least one type of authorization information. Both transmission coils 11 and 12 are electrically connected to, respectively, the first input 14 and the second input 15 of the transponder-communication device 9 by a connection 16 or 17, respectively. In the same way as in the two motor vehicles 1 shown in FIGS. 1 and 3, the transponder communication device 9 of the access control system 8 of the restricted-access room 81 is capable of detecting first identification information formed by authorization information contained in received transponder signals, and second identification information formed by amplitude information corresponding to the amplitudes of received transponder signals.

The access control system 8 of the restricted-access room 81 shown in FIG. 4 further comprises the first activation device 18, which can be activated, and the second activation device 67, which can be activated. These two first activation devices 18 and 67 are formed by so-called presence or motion sensors whose operation is for example based on an infrared technique and by means of which the presence of a person before the respective door 83 or 84 can be detected. When a person comes within the detection range of a presence detector, the presence detector forming the activation device 18 or 67 supplies an activation signal AS1 or AS2, respectively. The activation signal AS1 is applied to the input 22 and the activation signal AS2 is applied to the input 74 of the transponder communication device 9. The first activation device 18 is associated with the first transmission coil 11 and the first door 83, as is indicated diagrammatically by means of the dash-dot lines 19 and 20 in FIG. 4. The second activation device 67 is associated with the second transmission coil 12 and the second door 84, as is indicated diagrammatically by means of the dash-dot lines 69 and 70 in FIG. 4. In the present case the first activation device 18 can initiate access through its associated first door 83. The second activation device 67 can initiate access through its associated second door 84.

The access control system 8 of the restricted-access room 81 in FIG. 3 further includes the first door opener 23 for the first door 83 and the second door opener 54 for the second door 84. Both door openers 23 and 54 can be actuated by means of the transponder communication device 9. For this purpose, the first door opener 23 is connected to the output 25 of the transponder communication device 9 via the connection 24. For this purpose, moreover, the second door opener 54 is connected to a further output 91 of the transponder communication device 9 via a further electrically conductive connection 90, which is shown diagrammatically. A first enable signal F1 generated by means of the logic device 45 can be applied to the output 25 via the amplifier 46 and can be transferred to the first door opener 23 via the connection 24 to actuate this opener. A second enable signal F2 to be generated by means of the logic device 45 can be applied to the further output 91 via a further amplifier 92 and can be transferred to the second door opener 54 via the connection 90 to actuate this opener.

Also in the restricted-access room 81 shown in FIG. 4, i.e. in its access control system 8, the two transmission coils 11 and 12 are advantageously constructed in such a manner that they have arbitrarily large receiving ranges. The receiving range of the first transmission coil 11 is represented diagrammatically as a dash-dot arrow of the length R1 in FIG. 4. The receiving range of the second transmission coil 12 is represented diagrammatically as a dash-dot arrow of the length R2 in FIG. 4. Both transmission coils 11 and 12 can receive a transponder signal supplied by, for example, a transponder 10 situated in front of the first door 83. A transponder signal supplied by said transponder 10 is received by the first transmission coil 11 with a greater amplitude than by the second transmission coil 12 owing to the different distances from this transponder 10, which is situated in front of the first door 83, to the first transmission coil 11 and to the second transmission coil 12.

As already stated, the transponder communication device 9 connected to the two transmission coils 11 and 12 is capable of detecting first identification information and second identification information, i.e. the authorization information contained in the received transponder signals and the amplitude information corresponding to the amplitudes of the received transponder signals. For this purpose, the restricted-access room 81 shown in FIG. 4 is equipped with substantially the same means as in the motor vehicle 1 shown in FIG. 3 and in a way very similar to that in the motor vehicle 1 shown in FIG. 1. For this reason, said means will not be described in any further detail.

When in the case of the restricted-access room 81 shown in FIG. 4, an authorized persons who wears a transponder 10 in his clothing, approaches the restricted-access room 81 in the area of the first door 83 and is detected by the presence detector forming the first activation device 18, the activation of the presence detector forming the first activation device 18 is detected by means of the first activation detector 41, which subsequently makes first activation information AI1 available on its output 42 and, moreover, the transponder 10 situated in the proximity of the first door 83 supplies a transponder signal containing authorization information—in response to an appropriate request from the transponder communication device 9, which will not be described any further here because it is not essential in the present case—which transponder signal, since the transponder 10 is disposed both in the receiving range of the first transmission coil 11 and in the receiving range of the second transmission coil 12, is received both by the first transmission coil 11 and by the second transmission coil 12. The transponder signal is received by the first transmission coil 11 with a greater amplitude than by the second transmission coil 12.

By means of the switching device 57 and the first amplifier 26 the transponder signals received with different amplitudes by the two transmission coils 11 and 12 are successively applied both to the first authorization information detector 28 and to the first amplitude detection means 34, as a result of which the—identical—authorization information contained in the transponder signals as first identification information is stored in different storage locations of the first authorization information memory 29 under control of the control device 44, and the amplitude information corresponding to the different amplitudes of the received transponder signals is stored as second identification information in a different storage locations in the first amplitude information memory 38 under control of the control device 44. Subsequently, also under control of the control device 44, the stored identification information, the reference authorization information stored in the reference authorization information memory 40, and the activation information AI1 available from the first activation detector 41 are applied to the logic device 45, which in the present case detects firstly that first activation information AI1 has been received, i.e. that the first activation device 18 has been activated, secondly that the detected authorization information received from the first authorization information memory 29 and the reference authorization information correspond, and thirdly that the amplitude information received from the first amplitude information memory 38 represents an amplitude of the transponder signal supplied by the first transmission coil 11 greater than the amplitude of the transponder signal supplied by the second transmission coil 12, which last-mentioned amplitude is represented by the second amplitude information received from the first amplitude information memory 38. After the three aforementioned conditions have been detected, which must be satisfied for authorized access to the restricted-access room 81, the logic device 45 supplies the first enable information F1 to the amplifier 46, via which the first enable information F1 is applied to the first door opener 23, upon which the first door opener 23 opens the first door 2 of the restricted-access room 81.

When an authorized person approaches the restricted-access room 81 in such a manner that he is closer to the first door 83 than to the second door 84, the transponder signal supplied by the transponder 10 carried by the authorized person is received by the first transmission coil 11 with a greater amplitude than by the second transmission coil 12. When in this situation at the same time an unauthorized person approaches the restricted-access room 81 in such a manner that he is closer to the second door 84 than to the first door 83, this does not result in the second door 84 being opened. This is because in this case the amplitude of the transponder signal received by the first transmission coil 11 is greater than the amplitude of the transponder signal received by the second transmission coil 12 and because, as a consequence, it is only possible to open the first door 83 when the first activation device 18 associated with the first door 83 is actuated. As long as the first activation device 18 is not actuated actuation of the second activation device 67 in the present situation does not result in any one of the two doors 83 and 84 being opened.

The invention is not limited to the embodiments described hereinbefore. The invention can also be used advantageously in other products than motor vehicles and restricted-access rooms. An access control system can also be adapted to control the access via more than four doors, for example in the case of a motor vehicle in which it is possible, in addition, to control the access via the hatchback or trunk lid. It is likewise possible to use a transponder communication device of a different circuit design. Moreover, it is possible to use activation devices of a different construction.

What is claimed is:

1. An access control system for controlling access to at least one space via at least one door and which includes a transponder communication device for providing contactless communication with at least one transponder which controls authorization to access via the at least one door, and which includes at least two transmission coils each having a given receiving range for receiving transponder signals which each contain at least one type of authorization information said coils being connected to the transponder communication device for detecting identification information representative of at least a part of a received transponder signal, and which includes a first activation device for activation by an authorized person, said first activation device being associated with the first transmission coil and the first door for initiating access to its associated first door said first activation device being connected to the transponder communication device for generating first activation information representing the activated first activation device, and which includes at least one door opener for activation by the transponder communication device so as to open a door, and which includes a logic device for activating the door opener of the first door upon receipt of identification information representing at least a part of a transponder signal received by the first transmission coil, and of first activation information, characterized in that the transmission coils have arbitrarily large receiving ranges, the first transmission coil and at least one further transmission coil are followed by amplitude detection means by which the amplitudes of the transponder signals supplied by these transmission coils are detected and by which, after the amplitudes have been detected, amplitude information is generated as identification information, the amplitude information generated by the amplitude detection means is applied to the logic device as identification information, the logic device detects a condition in which the amplitude of the transponder signal supplied by the first transmission coil is greater than the amplitude supplied by the at least one further transmission coil, the door opener of the first door being activated only by means of the logic device upon detection of this condition.

2. A system as claimed in claim 1, characterized in that the first transmission coil, which is associated with the first door and the first activation device, is associated, in addition, with a further first activation device, which in its turn is associated with a further first door.

3. A system as claimed in claim 1, characterized in that a second transmission coil is associated with a second door and there has been provided at least one second activation device which can be activated by an authorized person and which is associated with the second transmission coil and the second door, by means of which second activation device the access via its associated second door can be initiated.

4. A system as claimed in claim 3, characterized in that the second transmission coil, which is associated with the second door and the second activation device, is associated, in addition, with a further second activation device, which in its turn is associated with a further second door.

5. A product including an access control system for controlling access to at least one space in the product via at least one door and which includes a transponder communication device for providing contactless communication with at least one transponder which controls authorization to access via the at least one door, and which includes at least two transmission coils each having a given receiving range for receiving transponder signals which each contain at least one type of authorization information said coils being connected to the transponder communication device for detecting identification information representative of at least a part of a received transponder signal, and which includes a first activation device for activation by an authorized person, said first activation device being associated with the first transmission coil and the first door for initiating access to its associated first door said first activation device being connected to the transponder communication device for generating first activation information representing the activated first activation device, and which includes at least one door opener for activation by the transponder communication device so as to open a door, and which includes a logic device for activating the door opener of the first door upon receipt of identification information representing at least a part of a transponder signal received by the first transmission coil, and of first activation information, characterized in that the transmission coils have arbitrarily large receiving ranges, the first transmission coil and at least one further transmission coil are followed by amplitude detection means by which the amplitudes of the transponder signals supplied by these transmission coils are detected and by which, after the amplitudes have been detected, amplitude information is generated as identification information, the amplitude information generated by the amplitude detection means is applied to the logic device as identification information, the logic device detects a condition in which the amplitude of the transponder signal supplied by the first transmission coil is greater than the amplitude supplied by the at least one further transmission coil, the door opener of the first door being activated only by means of the logic device upon detection of this condition.

6. A product as claimed in claim 5, characterized in that the first transmission coil, which is associated with the first door and the first activation device, is associated, in addition, with a further first activation device, which in its turn is associated with a further first door.

7. A product as claimed in claim 5, characterized in that a second transmission coil is associated with a second door and there has been provided at least one second activation device which can be activated by an authorized person and which is associated with the second transmission coil and the second door, by means of which second activation device the access via its associated second door can be initiated.

8. A product as claimed in claim 7, characterized in that the second transmission coil, which is associated with the second door and the second activation device, is associated, in addition, with a further second activation device, which in its turn is associated with a further second door.

9. A product as claimed in claim 5, characterized in that the product is a motor vehicle and the first door is the driver's door of the motor vehicle.

10. A product as claimed in 7, characterized in that the product is a motor vehicle and the first door is the driver's door of the motor vehicle and the second door is the front passenger's door.

* * * * *